(12) United States Patent
Song et al.

(10) Patent No.: US 8,442,121 B2
(45) Date of Patent: May 14, 2013

(54) METHOD, APPARATUS AND SYSTEM FOR CONTROLLING A SCENE STRUCTURE OF MULTIPLE CHANNELS TO BE DISPLAYED ON A MOBILE TERMINAL IN A MOBILE BROADCAST SYSTEM

(75) Inventors: Young-Joo Song, Suwon-si (KR); Ki-Ho Jung, Gwacheon-si (KR); Young-Kwon Lim, Goyang-si (KR); Je-Chang Jeong, Seoul (KR); Kook-Heui Lee, Yongin-si (KR)

(73) Assignee: Samsung Electronics Co., Ltd., Seoul (KR)

( * ) Notice: Subject to any disclaimer, the term of this patent is extended or adjusted under 35 U.S.C. 154(b) by 1254 days.

(21) Appl. No.: 11/581,058

(22) Filed: Oct. 16, 2006

(65) Prior Publication Data

US 2007/0107018 A1 May 10, 2007

(30) Foreign Application Priority Data

Oct. 14, 2005 (KR) .................. 10-2005-0097242
Jan. 11, 2006 (KR) .................. 10-2006-0003339
Mar. 29, 2006 (KR) .................. 10-2006-0028672

(51) Int. Cl.
*H04N 7/12* (2006.01)
*H04N 11/02* (2006.01)
*H04N 11/04* (2006.01)
*H04N 5/45* (2006.01)
*H04N 7/173* (2006.01)
*H04L 12/56* (2006.01)

(52) U.S. Cl.
USPC ............ 375/240.25; 375/240.01; 348/565; 725/87; 370/394

(58) Field of Classification Search ............ 375/240.25
See application file for complete search history.

(56) References Cited

U.S. PATENT DOCUMENTS

| 6,204,887 | B1 * | 3/2001 | Hiroi ............................ 348/565 |
| 7,259,770 | B2 * | 8/2007 | Miyata ......................... 345/620 |
| 7,907,665 | B2 * | 3/2011 | Wells et al. ............... 375/240.01 |
| 2002/0024952 | A1 * | 2/2002 | Negishi et al. ............... 370/394 |
| 2003/0229900 | A1 * | 12/2003 | Reisman ........................ 725/87 |
| 2005/0162337 | A1 * | 7/2005 | Ohashi et al. ................ 345/1.1 |
| 2005/0196057 | A1 | 9/2005 | Suh et al. |

FOREIGN PATENT DOCUMENTS

| JP | 2001-148816 A | 5/2001 |
| JP | 2003-101893 | 4/2003 |
| JP | 2004-104518 A | 4/2004 |
| KR | 10-1998-043984 A | 9/1998 |
| KR | 2004-88732 | 3/2003 |
| KR | 10-2004-0070507 A | 8/2004 |
| RU | 2154357 C2 | 8/2000 |

* cited by examiner

*Primary Examiner* — Christopher S Kelley
*Assistant Examiner* — Hee-Yong Kim
(74) *Attorney, Agent, or Firm* — Roylance, Abrams, Berdo & Goodman, L.L.P.

(57) ABSTRACT

A method, apparatus and system are provided for controlling a scene structure of a mobile terminal for receiving and displaying data streams in a mobile broadcast system. When logical channels are multiplexed into one physical channel, the multiplexed channels are sequentially decoded and are displayed on an image. A channel circulation scene alternately displays the channels on one image in designated order. In a combination scene structure, a new node is added to a conventional Lightweight Application Scene Representation (LASeR) technology. To compose a scene, fields for time information and scene transition effect are provided. A delay time due to a channel change is reduced. A multi-channel image is effectively provided to address a problem when a user retrieves service content while directly switching a channel. The terminal dynamically composes the multi-channel image using stream source node information from a service provider without an additional mosaic channel.

24 Claims, 9 Drawing Sheets

METHOD, APPARATUS AND SYSTEM FOR CONTROLLING A SCENE STRUCTURE OF MULTIPLE CHANNELS TO BE DISPLAYED ON A MOBILE TERMINAL IN A MOBILE BROADCAST SYSTEM

PRIORITY

This application claims the benefit under 35 U.S.C. §119 (a) to three applications filed in the Korean Intellectual Property Office on Oct. 14, 2005, Jan. 11, 2006 and Mar. 29, 2006 and assigned Serial Nos. 2005-97242, 2006-03339 and 2006-28672, the entire disclosures of which are hereby incorporated by reference.

BACKGROUND OF THE INVENTION

1. Field of the Invention

The present invention generally relates to a display technology of a mobile terminal in a mobile broadcast system. More particularly, the present invention relates to a method, apparatus and system for controlling a scene structure of a mobile terminal for receiving and displaying data streams in a mobile broadcast system.

2. Description of the Related Art

Lightweight Application Scene Representation (LASeR) is the format of multimedia content for a simple multimedia service in terminals such as mobile phones which may suffer from communication resource shortages. The LASeR is analogous to the technology of the Moving Picture Experts Group-4 Binary Format for Scene (MPEG-4 BIFS). The BIFS is the scene description standard for all multimedia contents and the LASeR is the scene description standard for multimedia terminals such as mobile phones small display sizes and a reduced network bandwidth.

The BIFS is used for an object-based system. In the object-based system, multimedia is a set of objects. Temporal and spatial information of each of the media must be indicated. For example, when the weather forecast is broadcast, four objects such as a weather caster, a weather chart displayed behind the weather caster, speech of the weather caster, and background music can be considered. When the multiple objects are present independently, an appearing time, disappearing time and position of each object should be defined to describe one scene. This definition is the BIFS. Because related information is stored in a binary file according to the BIFS, the storage capacity is reduced.

However, the BIFS has a large amount of data of about 200 pages as described in the MPEG-4 system standard document (International Organization for Standardization/International Electro-technical Commission (ISO/IEC) 14496-1). It is difficult to use the BIFS in communication environments suffering from a shortage of available resources, such as in mobile terminals. An alternative plan is the LASeR. The LASeR is the technology developed for free representations of various multimedia and interactions with users in mobile terminals with limited memory and power by performing multiplexing and synchronization processes for different elementary streams (ESs) such as a scene description, video, audio, image, font, and metadata, and minimizing complexity. The ESs have the above-described generic meaning. The ESs are considered to be individual logical channels configuring multiple channels to be displayed.

The LASeR ES is constructed with an access unit (AU) including a command. The command is used to change the scene characteristic at a particular time. Simultaneous commands are grouped in one AU. The AU may be one scene image, short sound, one graphic image, or short animation. A LASeR browser displays ESs in a designated order. The hierarchy is present between the ESs. The LASeR browser displays scenes in order of: (1) packet reception, (2) packet decoding (AU-by-AU recovery of one image and one video clip, among others), (3) command execution, (4) audio/video object rendering, (5) user interaction (selection and dragging, among others), and (6) local connection or connection with an external information source.

Alternatively, the standardization for the convergence of the LASeR and World Wide Web Consortium (W3C) is ongoing. Specifically, the 3rd Generation Partnership Project (3GPP) employs a scalable vector graphics (SVG) standard of the W3C for graphic or animation representation. When the SVG standard is employed, audio, video, characters, images and polyhedrons may be represented. In relation to the SVG, the conventional LASeR technology has been proposed only to compose a movie tile using a clip path of SVG 1.1 such that a channel mosaic service for multiple channels is provided. Using the LASeR technology in a mobile terminal creates a problem in identifying channel stream content in service when a screen image of the mobile terminal is tiled. Using the LASeR technology in a mobile terminal facilitates the display of channels because a screen size of the mobile terminal is smaller than those of terminal and personal computer (PC) systems for receiving existing broadcast services.

For example, the currently proposed stream source technology for composing a multi-channel image displays multiple broadcast service channels on one image by multiplexing multiple images into one channel for the channel mosaic service and allocating an additional encoded mosaic service channel. When the channel mosaic service is applied to mobile broadcasting, significant costs are required for the network infrastructure construction. When limited channel resources are considered, it is difficult to actually implement one video channel dedicated for the mosaic service. When multiple images are to be processed in a stream source scheme and are multiplexed and encoded into one channel, the image quality may be degraded.

Accordingly, there is a need for an improved system and method for accurately implementing one video channel dedicated for a mosaic service when limited channel resources are considered and to reduce the degradation of image quality.

SUMMARY OF THE INVENTION

An aspect of exemplary embodiments of the present invention is to address at least the above problems and/or disadvantages and to provide at least the advantages described below. Accordingly, an aspect of an exemplary embodiment of the present invention is to provide a method, apparatus and system for controlling a scene structure to be displayed on a mobile terminal in a mobile broadcast system for providing a broadcast service in a stream source scheme.

It is another object of an exemplary embodiment of the present invention to provide a method, apparatus and system for controlling a scene structure to be displayed on a mobile terminal for receiving a broadcast service when multiple logical channels are multiplexed into one physical channel in a mobile broadcast system.

It is yet another object of an exemplary embodiment of the present invention to provide a method, apparatus and system for controlling a scene structure of multiple channels that can compose and display a multiplexed channel image on a mobile terminal without transmitting an additional mosaic channel when multiple logical channels are multiplexed into one physical channel in a mobile broadcast system.

In accordance with an aspect of an exemplary embodiment of the present invention, there is provided a method for controlling a scene structure of multiple channels to be displayed on a mobile terminal in a mobile broadcast system. A physical channel is received into which multiple logical channels are multiplexed for a broadcast service from a service provider and stream source node information for controlling the scene structure. The received physical channel is demultiplexed and decoded on a logical channel-by-logical channel basis. Logical channel-by-logical channel elementary streams are displayed on an image in at least one display mode provided from the stream source node information.

In accordance with another aspect of an exemplary embodiment of the present invention, there is provided an apparatus for receiving a broadcast service in a mobile terminal of a mobile broadcast system. This apparatus comprises a receiver, a demultiplexor, a buffer and an image compositor. The receiver receives, a physical channel into which multiple logical channels are multiplexed for a broadcast service from a service provider and stream source node information for controlling a scene structure. The demultiplexer demultiplexes the received physical channel on a logical channel-by-logical channel basis. The buffer divides and stores logical channel-by-logical channel elementary streams. The image compositor controls an operation for displaying the logical channel-by-logical channel elementary streams on an image in at least one display mode provided from the stream source node information.

In accordance with yet another aspect of an exemplary embodiment of the present invention, there is provided a mobile broadcast system for providing a broadcast service to at least one mobile terminal, comprising a service provider and a mobile terminal. The service provider receives a physical channel into which multiple logical channels are multiplexed for the broadcast service and stream source node information for controlling a scene structure. The mobile terminal receives the physical channel and the stream source node information through a predetermined communication network and displaying a multi-channel image. The mobile terminal comprises a demultiplexer, a buffer and an image compositor. The demultiplexer demultiplexes the received physical channel on a logical channel-by-logical channel basis. The buffer divides and stores logical channel-by-logical channel elementary streams. The image compositor controls an operation for displaying the logical channel-by-logical channel elementary streams on the image in at least one display mode provided from the stream source node information.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

According to a basic concept, an exemplary embodiment of the present invention proposes a stream source node structure in which a terminal at a receiving side directly composes and displays a multiplexed channel image in a state in which any additional channel for composing an image is not transmitted when multiple logical channels are multiplexed into one physical channel in a mobile broadcast system. In a method for composing a channel mosaic image using the stream source node in accordance with a first exemplary embodiment of the present invention, all multiple channels which are currently provided may be displayed on one image. According to an exemplary implementation, the image is divided in the form of tiles and each division region displays one channel. A second exemplary embodiment of the present invention proposes a method for controlling a scene structure in a channel circulation scheme for displaying channels currently being provided in a time sequence. When the channel circulation scheme is employed to alternately display logically multiplexed channels on one image in designated order, only one channel is displayed on a screen of the mobile terminal with a limited size. This facilitates a user's ability to easily identify service content. A third exemplary embodiment of the present invention provides a combination of the channel mosaic scene structure and the channel circulation scene structure, such that the screen with the limited size in the mobile terminal may be efficiently employed. The third exemplary embodiment of the present invention may employ the benefit of the channel circulation scheme in which the user can sequentially retrieve all channels currently being provided without additionally inputting a key. The exemplary embodiments of the present invention for a multi-channel scene structure service will be described in detail.

Figure 1:
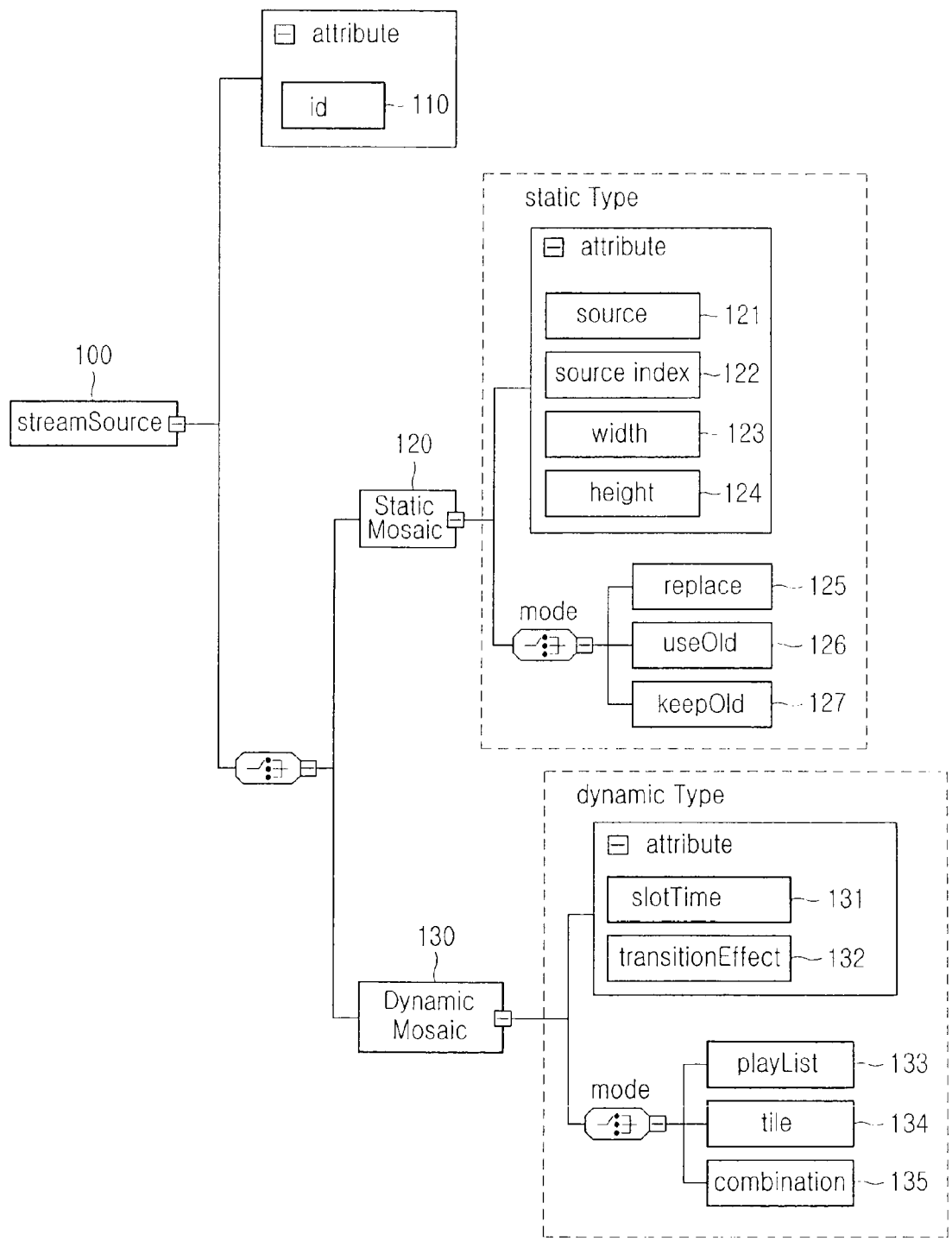
FIG. 1 illustrates an example of a structure of a stream source for a scene structure of multiple channels in a mobile broadcast system in accordance with an exemplary embodiment of the present invention.

FIG. 1 illustrates an example of a structure of a stream source for a scene structure of multiple channels in a mobile broadcast system in accordance with an exemplary embodiment of the present invention. A type of a stream source node 100 as illustrated in FIG. 1 is based on a Lightweight Application Scene Representation (LASeR) technology for the multi-channel scene structure.

Information to be transmitted from the stream source node 100 includes a unique identifier (ID) field of a stream source, and a static mosaic field 120 for indicating static mosaic composition mode and a dynamic mosaic field 130 for indicating dynamic mosaic composition mode for an image representation. Further, the static mosaic field 120 includes a source field 121 for indicating IDs of media sources to be referred to by the stream source, a source index field 122 for indicating an index of a source used to compose a current scene, and a width field 123 and a height field 124 for indicating a buffer size.

The static mosaic field 120 further includes a replace field 125, a useOld field 126 and a keepOld field 127. The replace field 125 immediately switches an image when the source index 122 is changed in display mode. The useOld field 126 continuously composes a previous source index on an image until image composition of a new source index is prepared. The keepOld field 127 decodes a previous source index and composes the decoded source index on the image while the previous source index is continuously received until the image composition of the new source index is prepared in a manner similar to that of the useOld mode. Alternatively, the dynamic mosaic field 130 includes a playList field 133, a tile field 134 and a combination field 135. The playlist field 133 sequentially displays different streams of a group on the image and the tile field 134 displays all streams of the group on one image. Two schemes are combined in the combination field 135. Further, the dynamic mosaic field 130 can additionally include a slotTime field 131 for indicating a display time allocated to each source stream (such as, each elementary stream (ES)) for composing one image in the tile or combination scheme and a transitionEffect field 132 to be used when one source stream is switched to another source stream.

Table 1 shows the fields included in the stream source node 100.

TABLE 1

| Field | Description | | |
|---|---|---|---|
| ID | ID of a stream source | | |
| staticMosaic | Static mosaic composition mode | | |
| | source | | Field for indicating array of grouped stream IDs |
| | sourceIndex | | Field for indicating an index of a source stream selected from the current image |
| | width | | Field for indicating a buffer size |
| | height | | Field for indicating a buffer size |
| | mode | Replace | Mode for immediately switching an image when a source index is changed |
| | | useOld | Mode for continuously composing a previous source index until image |

TABLE 1-continued

| Field | Description | | |
|---|---|---|---|
| | | | composition of a new source index is prepared |
| | | keepOld | Mode for decoding a previous source index and composing the decoded source index on an image while continuously receiving the previous source index until image composition of a new source index is prepared |
| dynamicMosaic | Dynamic mosaic composition mode | | |
| | slotTime | | Image display time allocated to each source stream |
| | transitioniEffect | | Transition effect when each source stream is changed |
| | mode | playList (FIG. 3) | Sequential image composition mode |
| | | tile (FIG. 2) | Mode for displaying all source streams on one image |
| | | combination (FIG. 4) | Combination mode in which sequential mode and tile mode are combined |

Table 2a and Table 2b illustrate a description in which the stream source node 100 is expressed in extensible markup language (XML). For convenience, one description is divided into Table 2a and Table 2b.

TABLE 2a

```
<element name="streamSource">
    <complexType id="MosaicType">
<choice>
<element name="StaticMosaic" types="staticType"/>
<element name="DynamicMosaic" types="dynamicType"/>
    </choice>
<atrribute name="id" use="required"/>
<complexType>
</element>
<complexType name="staticType">
<attribute name="mode" use="required">
<simpleType>
    <restriction base="string">
    <enumeration value="replace"/>
    <enumeration value="useOld"/>
    <enumeration value="keepOld"/>
</restriction>
</simpleType>
</attribute>
<attribute name="source" use="required"/>
<attribute name="sourceIndex" use="required"/>
<attribute name="width" use="required"/>
<attribute name="height" use="required"/>
</complexType>
```

TABLE 2b

```
<complexType name="dynamicType">
<atrribute name="mode" use="required">
<simpleType>
    <restriction base="string">
    <enumeration value="playList"/>
    <enumeration value="tile"/>
    <enumeration value="combination"/>
</restriction>
</simpleType>
</attribute>
```

TABLE 2b-continued

```
        <attribute name="slotTime" use="decimal"/>
        <attribute name="transitionEffect">
        <simpleType>
            <restriction base="string">
            <enumeration value="fadeIn"/>
            <enumeration value="fadeOut"/>
            <enumeration value="crossFade"/>
            <enumeration value="wipe"/>
            <enumeration value="pageEffect"/>
            <enumeration value="split"/>
            <enumeration value="zoom"/>
            </restriction>
        </simpleType>
        </attribute>
    </complexType>
```

The exemplary embodiments of the present invention using the stream source 100 of FIG. 1 will be described in detail.

Figure 2:
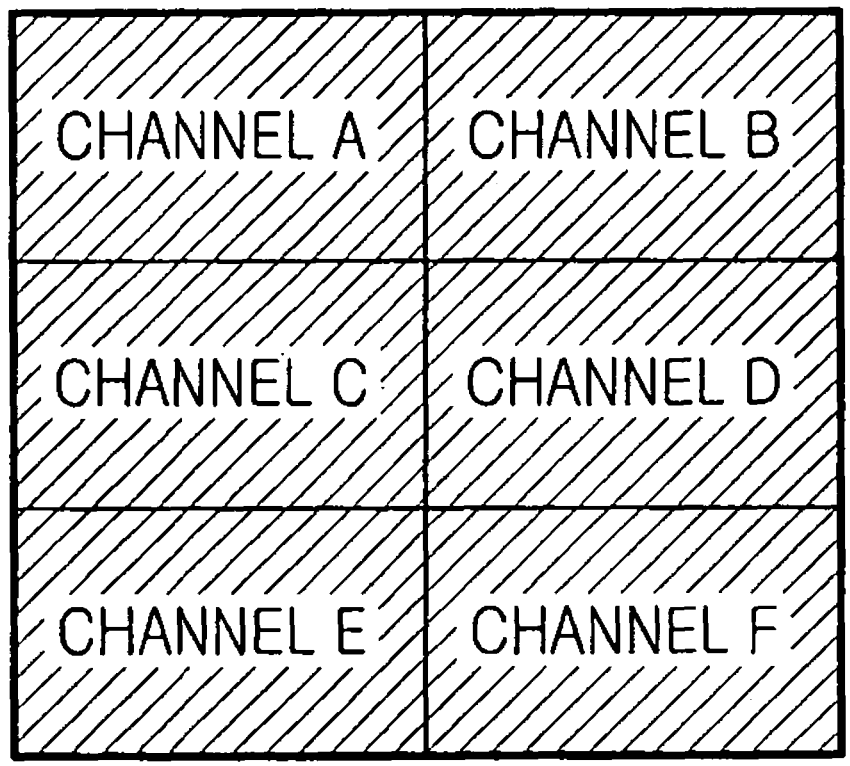
FIG. 2 illustrates an example of a channel mosaic service in accordance with a first exemplary embodiment of the present invention.

FIG. 2 illustrates an example of a channel mosaic service in accordance with the first exemplary embodiment of the present invention.

Referring to FIG. 2, a channel mosaic image composition scheme is a technology for controlling a scene structure required to display all channel contents which are currently provided on one image by dividing one image of the terminal in the tile mode and displaying contents of decoded channels (such as, Channel A~Channel F) on division regions. When the tile mode 134 is selected in the dynamic mosaic field 130 for indicating the dynamic mosaic composition mode of the stream source node 100 of FIG. 1, an image is composed in a channel mosaic scheme as illustrated in FIG. 2.

Figure 3:
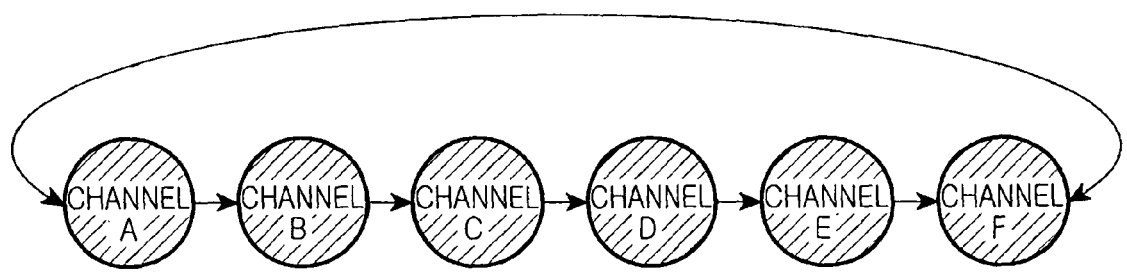
FIG. 3 illustrates an example of a scene structure of a channel circulation scheme in accordance with a second exemplary embodiment of the present invention.

FIG. 3 illustrates an example of a scene structure of a channel circulation scheme in accordance with the second exemplary embodiment of the present invention.

Referring to FIG. 3, an ES of each channel (of Channel A~Channel F) multiplexed and combined in one group is displayed on the screen of the mobile terminal during an allocated display time indicated by the slotTime field 131 and then is switched to an ES of the next channel. When the channel is switched, a scene structure can be controlled by using the transition effects as shown in Table 3.

Table 3 shows the channel transition effects and components in the example of the transitionEffect field 132.

TABLE 3

| Effect Name | Description |
| --- | --- |
| fadeIn | Effect in which an image gradually appears |
| Fadeout | Effect in which an image gradually disappears |
| crossFade | Effect in which two images overlap during a predetermined time while an existing image is changed to a new image |
| Wipe | Effect in which a new image appears on a region where an existing image disappears in a predetermined direction |
| pageEffect | Effect in which an image disappears or appears as if a book is paged |
| Split | Effect in which an existing image splits and disappears and then a new image appears |
| Zoom | Effect in which a new image appears in a small size and gradually increases while occupying the whole screen |

In Table 3, the fadeIn effect is the effect in which an image gradually appears, the fadeOut effect is the effect in which an image gradually disappears, and the crossFade effect is the effect in which two images overlap during a predetermined time while an existing image is switched to a new image. The wipe effect is the effect in which a new image appears in a region in which an existing image disappears in the left, right, top or down direction. The pageEffect is the effect in which a new or previous image is paged. The split effect is the effect in which an existing image splits and disappears and then a new image appears. The zoom effect is the effect in which a new or previous image appears or disappears in a small size or gradually increases while occupying the whole screen.

The third exemplary embodiment of the present invention is a method for controlling a scene structure in a hybrid or combination scheme that can compensate for a disadvantage of the channel mosaic scene composition mode and benefit from an advantage of the channel circulation scene structure.

Figure 4:
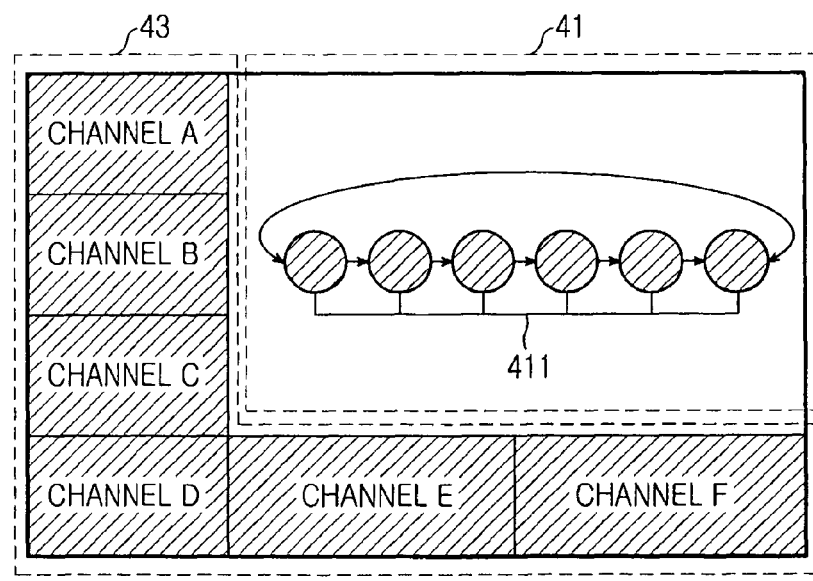
FIG. 4 illustrates an example of a scene structure of a combination scheme in accordance with a third exemplary embodiment of the present invention.

FIG. 4 illustrates an example of a scene structure of the combination scheme in accordance with the third exemplary embodiment of the present invention.

Referring to FIG. 4, an entire image to be displayed is divided into a main image region 41 and a sub-image region 43 using a clip path technology through a display means of the mobile terminal. For example, contents of multiple channels 411 are allocated to the main image region 41 which is larger than the sub-image region 43, for a channel circulation scene structure service in the channel circulation scheme as described with reference to the second exemplary embodiment of the present invention. According to an exemplary implementation, the sub-image region 43 displays decoded channel content on an associated channel region (of Channel A~Channel F), such that the contents of all the channels currently being provided can be displayed on one image.

Figure 5:
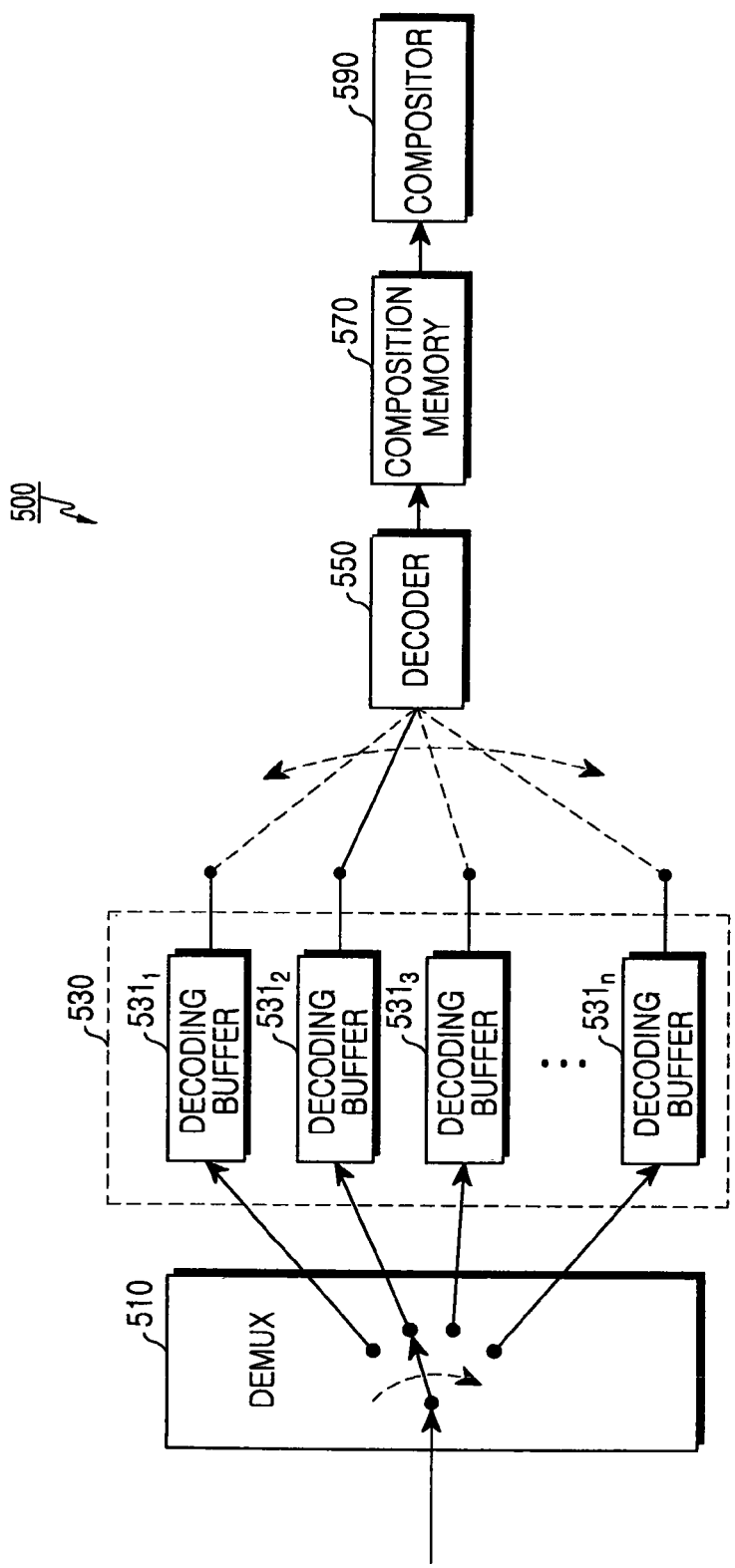
FIG. 5 is a block diagram illustrating a structure of a receiver in the mobile broadcast system in accordance with an exemplary embodiment of the present invention.

FIG. 5 is a block diagram illustrating a structure of a receiver in the mobile broadcast system in accordance with an exemplary embodiment of the present invention.

In FIG. 5, a demultiplexer (DEMUX) 510 separates multiple logical channels transmitted in one physical channel on a channel-by-channel basis. The separated channels are allocated to multiple decoding buffers 530, such as, $530_1 \sim 530_n$. A decoder 550 which is selectively or cyclically connected to the multiple decoding buffers 530 selects or circulates a logical channel frame stored in each decoding buffer 530. The decoder 550 then decodes an associated logical channel, and outputs the decoded logical channel to a composition memory (CM) 570. To compose an image to be displayed, an image compositor 590 composes and displays a frame of each decoded logical channel stored in the composition memory 570 on a screen of the terminal.

In FIG. 5, the image compositor 590 is configured to control the scene structure of the channel mosaic scheme in accordance with the first exemplary embodiment of the present invention, the scene structure of the channel circulation scheme in accordance with the second exemplary embodiment of the present invention, or the scene structure of the combination scheme in accordance with the third exemplary embodiment of the present invention. In FIG. 5, the image compositor 590 can selectively control the scene structure of the channel circulation scheme, the combination scheme, or the channel mosaic scheme.

A method for controlling a scene structure of multiple channels in accordance with an exemplary embodiment of the present invention will be described with reference to FIGS. 6 to 8. The method which is described below is an operation of the image compositor 509 of FIG. 5.

Figure 6:
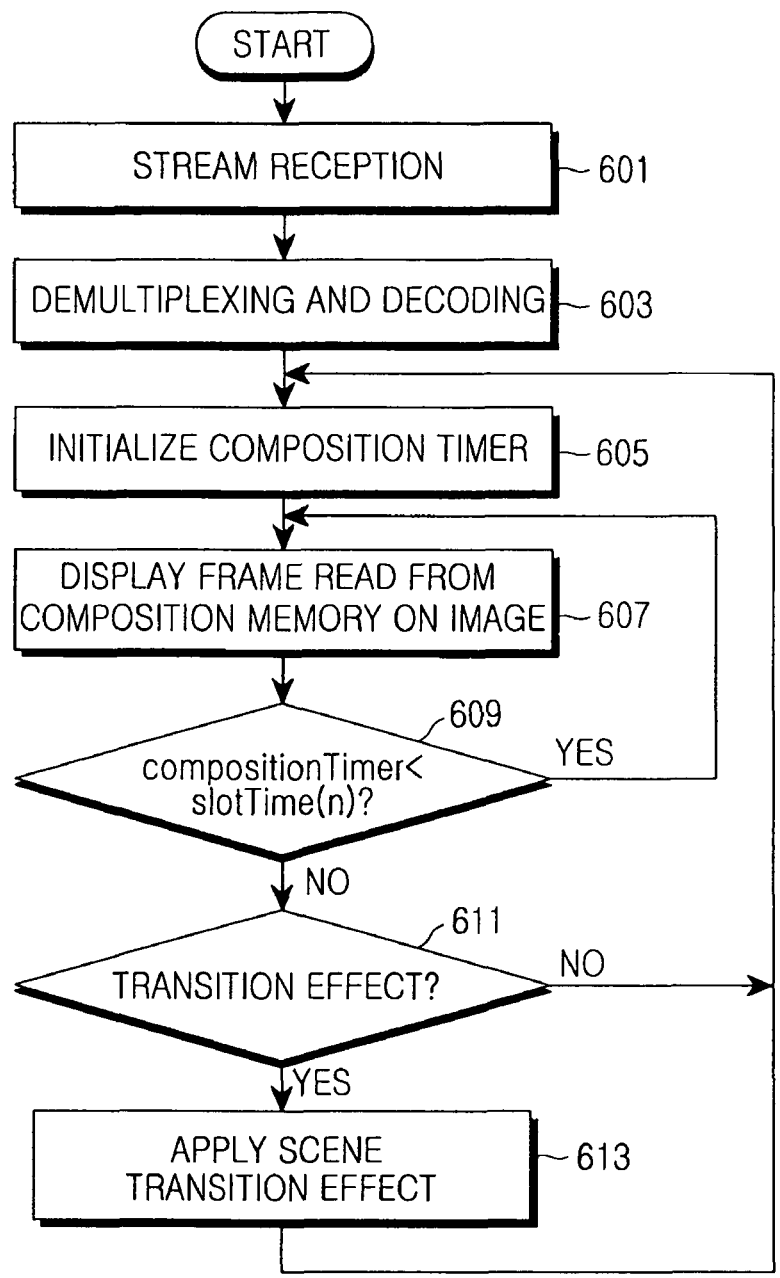
FIG. 6 is a flowchart illustrating a method for controlling the scene structure of the channel circulation scheme in accordance with the second exemplary embodiment of the present invention.

FIG. 6 is a flowchart illustrating a method for controlling the scene structure of the channel circulation scheme in accordance with the second exemplary embodiment of the present invention.

When the mobile terminal receives LASeR data streams of multiple channels from a service provider in step 601, the demultiplexer 510 separates multiplexed logical channels on a channel-by-channel basis and allocates the separated logical channels to the decoding buffers 530 in step 603. The decoder 550 circulates the logical channels output to the decoding buffers 530, decodes the associated logical channels to ESs, and outputs the decoded ESs to the composition memory 570. When the channel-by-channel decoded ESs are output to the composition memory 570, the image compositor 590 of FIG. 5 initializes an internal composition timer (not illustrated) in step 605. In step 607, frames of the channel-by-channel ESs are read from the composition memory 570 according to a designated sequence number or randomly and then displayed on the screen of the mobile terminal. The frames are read and displayed by the image compositor 590.

In step 609, the image compositor 590 determines whether a display time of one logical channel counted through the internal composition timer has elapsed by a designated slot time (slotTime(n)) of each ES. If the slot time (slotTime(n)) has not elapsed, the image compositor 590 proceeds to step 607 to continuously display a scene of an associated logical channel. If the composition timer has reached the slot time (slotTime(n)), the image compositor 590 proceeds to step 611. In step 611, the image compositor 590 determines whether to apply scene (image) transition effect. If the scene (image) transition effect is set, the image compositor 590 applies the scene (image) transition effect in step 613 and then proceeds to step 605 to repeat initialization of the timer and to display an ES of the next logical channel on the screen.

Figure 7:
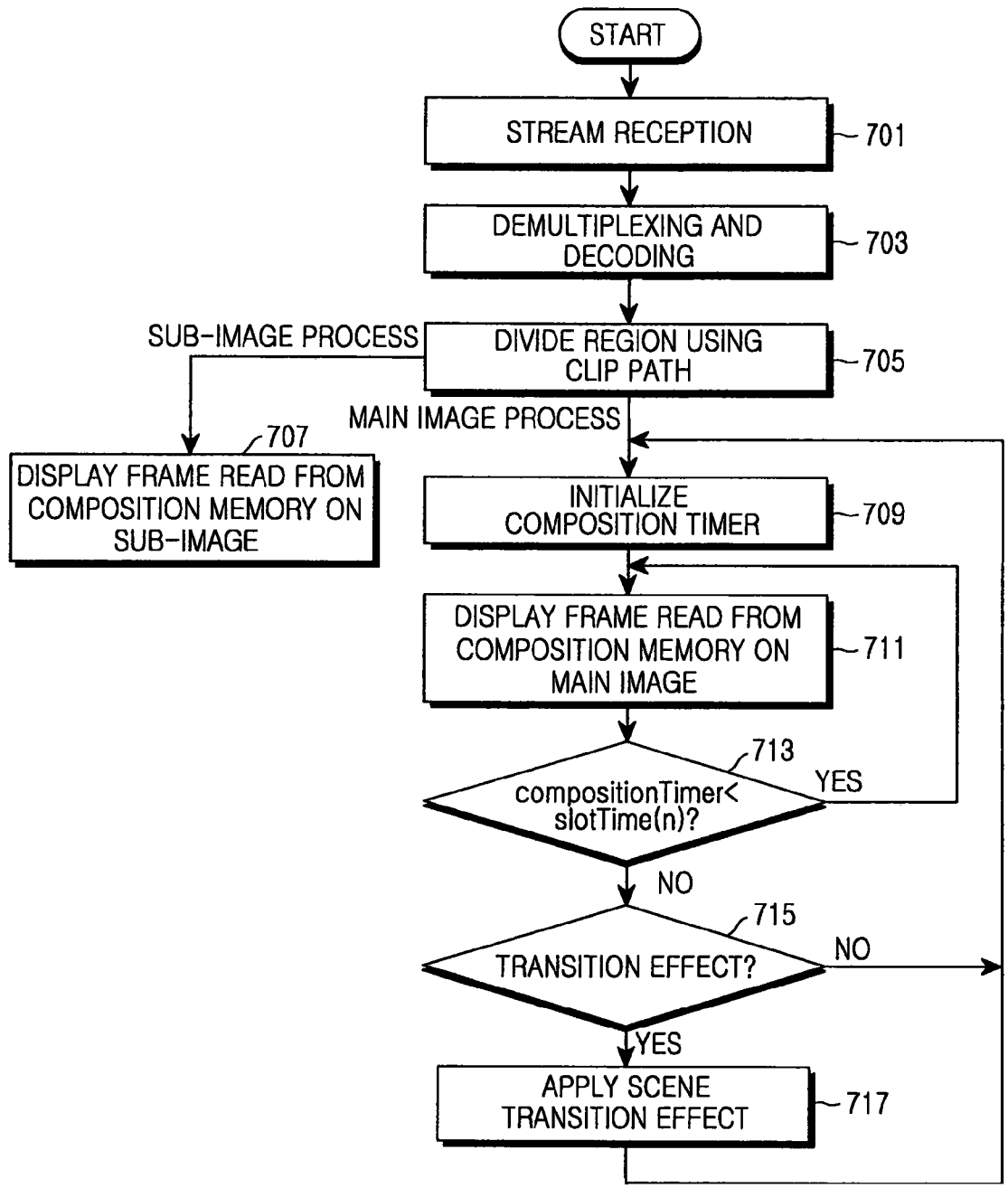
FIG. 7 is a flowchart illustrating a method for controlling the scene structure of the combination scheme in accordance with the third exemplary embodiment of the present invention.

FIG. 7 is a flowchart illustrating a method for controlling the scene structure of the combination scheme in accordance with the third exemplary embodiment of the present invention.

When the mobile terminal receives LASeR data streams of multiple channels from the service provider in step 701, the demultiplexer 510 separates multiplexed logical channels on a channel-by-channel basis and allocates the separated logical channels to the decoding buffers 530 in step 703. The decoder 550 circulates the logical channels output to the decoding buffers 530, decodes the associated logical channels to ESs, and outputs the decoded ESs to the composition memory 570. In step 705, the image compositor 590 divides the entire image to be displayed on the terminal into the main image region 41 for the channel circulation scene structure and the sub-image region 43 to which channel-by-channel regions are allocated. The image compositor 590 divides the entire image by using a clip path as illustrated in the example of FIG. 4.

In step 707, the image compositor 590 reads frames of ESs mapped to channel-by-channel regions from the composition memory 570 and allocates and displays the read frames on the associated channel-by-channel regions. Further, the image compositor 590 in which an image division operation has been performed in step 705 initializes the internal composition timer so that the channel circulation scene structure may be displayed on the main image region 41 in step 709. In step 711, the image compositor 590 reads frames of the channel-by-channel ESs from the composition memory 570 according to a designated sequence number or randomly and then displays the frames on the main image region 41. In FIG. 7, steps 707 and 711 are divided. However, steps 707 and 711 can be simultaneously performed.

In step 713, the image compositor 590 determines whether a display time of one logical channel counted through the internal composition timer has elapsed by a designated slot time (slotTime(n)). If the slot time (slotTime(n)) has not elapsed, the image compositor 590 proceeds to step 711 to continuously display a scene of an associated logical channel. If the composition timer has reached the slot time (slotTime(n)), the image compositor 590 proceeds to step 715. In step 715, the image compositor 590 determines whether to apply scene (image) transition effect. If the scene (image) transition effect is set, the image compositor 590 applies the scene (image) transition effect in step 717 and then proceeds to step 709 to repeat a task for initializing the timer and to display an ES of the next logical channel on the screen.

Figure 8:
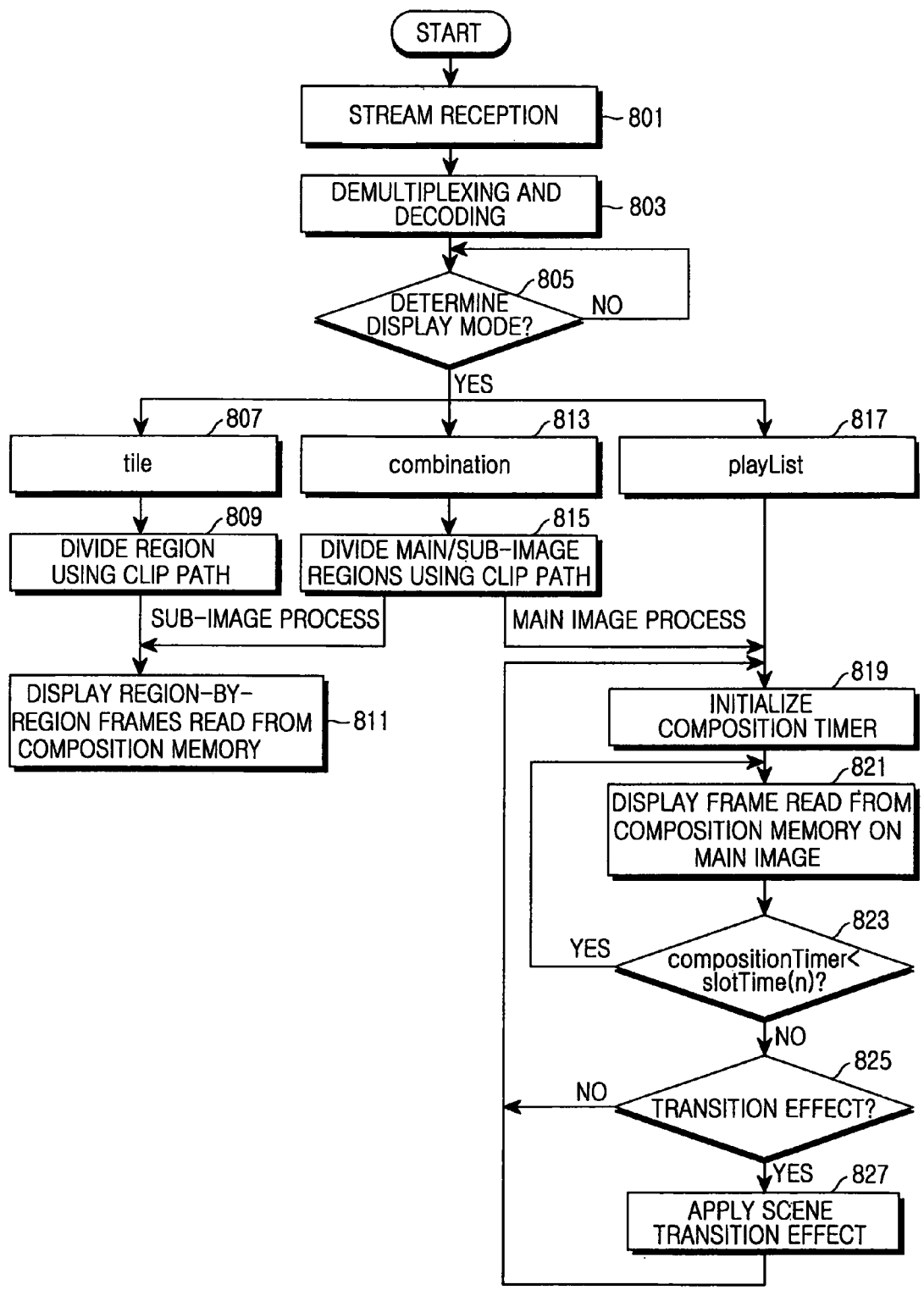
FIG. 8 is a flowchart illustrating an operation for selectively implementing the scene structure of the channel mosaic scheme, the channel circulation scheme or the combination scheme in accordance with an exemplary embodiment of the present invention.

FIG. 8 is a flowchart illustrating an operation for selectively implementing the scene structure of the channel mosaic scheme, the channel circulation scheme or the combination scheme in the image compositor 590 of FIG. 5 in accordance with an exemplary embodiment of the present invention.

In FIG. 8, when the mobile terminal receives LASeR data streams of multiple channels from the service provider in step 801, the demultiplexer 510 separates multiplexed logical channels on a channel-by-channel basis and allocates the separated logical channels to the decoding buffers 530 in step 803. The decoder 550 circulates the logical channels output to the decoding buffers 530, decodes the associated logical channels to ESs, and outputs the decoded ESs to the composition memory 570. In step 805, the image compositor 590 determines display mode of the associated group ID when a physical channel with a new group ID has been received.

Similar to the stream source node 100 of FIG. 1, the dynamic mosaic field 130 includes the playList field 133 for sequentially displaying different streams of a group on an image, the tile field 134 for displaying all streams of the group on one image, and the combination field 135 in which two schemes are combined. According to the three fields, the display modes are possible.

When the display mode determined in step 805 is a channel mosaic scene structure indicated by the tile field 134 of FIG. 1 in step 807, the image compositor 590 divides an image using clip path information and allocates regions on a logical channel-by-channel basis in step 809. In step 811, the image compositor 590 reads and displays frames of ESs mapped to the channel-by-channel regions from the composition memory 570.

When the display mode determined in step 805 is a channel circulation scene structure indicated by the playList field 133 of FIG. 1 in step 817, the image compositor 590 initializes the timer in step 819 and then reads and displays an ES of one logical channel from the composition memory 570 in step 821. In step 823, the image compositor 590 determines whether a display time of one logical channel counted through the internal composition timer has elapsed by a designated slot time (slotTime(n)). If the slot time (slotTime(n)) has not elapsed, the image compositor 590 proceeds to step 821 to continuously display a scene of an associated logical channel. If the composition timer has reached the slot time (slotTime(n)), the image compositor 590 proceeds to step 825. In step 825, the image compositor 590 determines whether to apply scene (image) transition effect. If the scene (image) transition effect is set, the image compositor 590 applies the scene (image) transition effect in step 827 and then proceeds to step 819 to repeat a task for initializing the timer and to display an ES of the next logical channel on the screen.

When the display mode which is determined in step 805 is a combination scene structure indicated by the combination field 135 of FIG. 1 in step 813, the image compositor 590 divides the entire image into the main image region 41 and the sub-image region 43 by using clip path information in step 815. A display operation of the sub-image region 43 allocates regions on a logical channel-by-channel basis in step 811. In the display operation of the main image region 41, the image compositor 590 initializes the timer to construct a channel circulation scene structure to be displayed on the main image region in step 819 and reads an ES of each channel from the composition memory 590 to display the read ES on the screen in step 821. When a display time of one channel has elapsed by a designated slot time, the image compositor 590 repeats an operation for displaying an ES of the next logical channel after verifying and applying the designated transition effect.

An exemplary embodiment of the present invention may define a channel circulation scene structure and a combination scene structure and may define a new node and method in order to address a problem in identifying logical channel stream content in service when an image of the mobile terminal is divided into tiles and the channels are displayed for the channel mosaic service.

A process in which a user terminal composes a multi-channel image without use of an additional mosaic channel in accordance with another exemplary embodiment of the present invention will be described with reference to FIGS. 9 and 10.

When multiple logical channels are multiplexed into one physical channel in this exemplary embodiment of the present invention, the terminal's decoder transfers decoded stream node information to the image compositor without transmitting an additional mosaic channel, such that a mosaic channel is constructed to dynamically compose an image of the multiple logical channels. The service provider provides the user terminal with the stream source node information of FIG. 9 including information about multiplexed logical channels and composition information for composing the multi-channel image.

Figure 9:
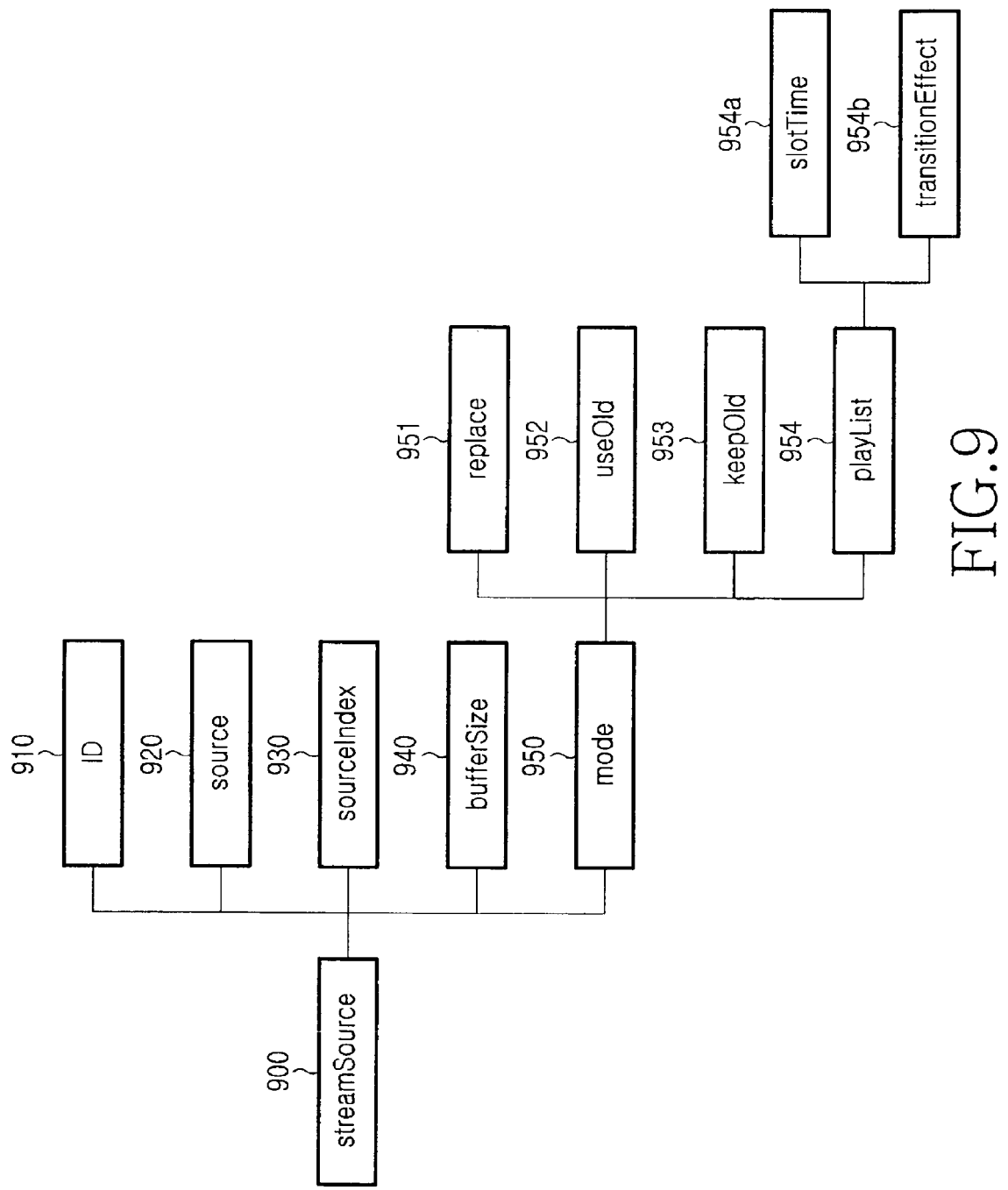
FIG. 9 illustrates another example of a structure of a stream source for a scene structure of multiple channels in the mobile broadcast system in accordance with an exemplary embodiment of the present invention.

FIG. 9 is another example of a structure of a stream source for a scene structure of multiple channels in the mobile broadcast system: in accordance with an exemplary embodiment of the present invention.

A stream source node 900 of FIG. 9 is an extension of the stream source node of the conventional LASeR technology. Information transmitted through the stream source node 900 includes a stream source ID field 910, a source field 920, a source index field 930, width/height field 940 and a mode field. The source field 920 indicates a list of IDs of media sources, such as, ESs (of logical channels), to be referred to by the stream source. The source index field 930 indicates an index of a media source used to construct the current scene structure to be displayed through the terminal. The width/height field 940 indicates a buffer size and a mode field 950 indicates the display mode as illustrated in FIG. 9.

According to an exemplary implementation, media source IDs included in the source field 920 in FIG. 9 are selected from channels viewed by users at a high hit rate. The mode field 950 includes a replace field 951 for immediately switching an image when the source index is changed and a useOld field 952 for continuously composing an ES of a previous source index on the image until image composition of a new source index is prepared. The mode field 950 also includes a keepOld field 953 for decoding an ES of the previous source index and composing the decoded ES on the image while continuously receiving the ES of the previous source index until the image composition of the new source index is prepared in a concept similar to that of the useOld mode, and a playList field 954 for sequentially displaying different streams of a group on an image. In an exemplary embodiment of the present invention, a slotTime field 954a for indicating a display time allocated to each ES and a transition effect field 954b to be used when one ES is switched to another ES are additionally defined in order to compose an image in a mosaic or round-robin scheme using the playList mode.

Table 4 shows fields included in the stream source node 900 of FIG. 9.

TABLE 4

| StreamSource | ID | | ID Field |
|---|---|---|---|
| | source | | Field for indicating a list of media source IDs to be referred to by a stream source |
| | sourceIndex | | Field for indicating an index of a source stream used for the current scene |
| | bufferSize (width, height) | | Field for indicating a buffer size |
| | mode | replace | replace field for immediately switching an image when a source index is changed |
| | | useOld | useOld field for continuously composing an ES of a previous source index on the image until image composition of a new source index is prepared |
| | | keepOld | keepOld field for decoding an ES of a previous source index and composing the decoded ES on an image while continuously receiving the previous source index until image composition of a new source index is prepared in a concept similar to that of the useOld mode |
| | | playList | slotTime Image display time allocated to each source |
| | | | Transition Effect Transition effect when one elementary source is changed to another elementary source |

An example of a scene structure of a channel circulation scheme is illustrated in FIG. 3 when a multi-channel scene structure is controlled using the stream source node 900 of FIG. 9. The transition effects and components at the time of channel switching are illustrated in Table 3. Therefore, a detailed description is omitted.

In terms of logically multiplexed channels, display structures such as a channel mosaic scene structure is provided to display the multiplexed channels in service using the stream source node 900 on one image. Also provided, is a channel circulation scene structure for cyclically displaying the multiplexed channels on one image in designated order, and a combination scene structure for displaying the multiplexed channels in a state in which the channel mosaic scene structure and the channel circulation scene structure are combined. The above-described display structures can be applied to other exemplary embodiments of the present invention.

The user terminal to which this exemplary embodiment of the present invention is applied may employ the structure of FIG. 5. In this exemplary embodiment of the present invention, the decoder 550 of FIG. 5 decodes information of the stream source node 900 received from the service provider and outputs the decoded information to the image compositor 590. The image compositor 590 dynamically composes the multi-channel image using the information of the stream source node 900 in a scheme selected from the channel mosaic scene structure and the channel circulation scene structure.

In the example of the channel circulation scene structure, the demultiplexer 510 separates multiple logical channels transmitted in one physical channel and allocates the separated channels to the decoding buffers 530. The decoder 550 decodes the information of the stream source node 900 received from the service provider to output the decoded information to the image compositor 590. Further, the decoder 550 circulates logical channel data stored in the decoding buffers $531_1 \sim 531_n$, decodes an associated logical channel, and outputs the decoded logical channel to the composition memory 570. The image compositor 590 composes and displays a frame of each decoded logical channel stored in the composition memory 570 on the image by referring to the information of the stream source node 900.

Figure 10:
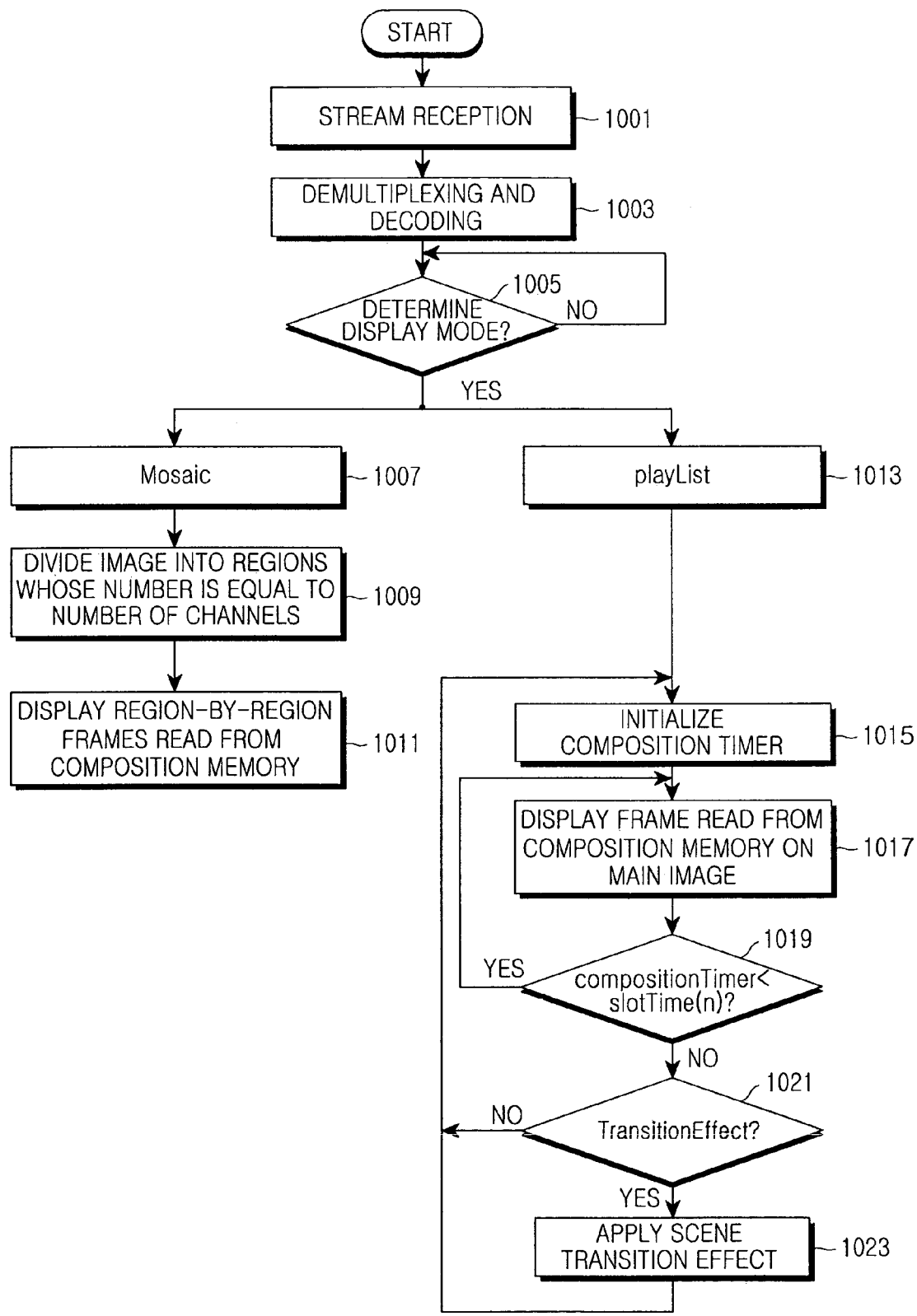
FIG. 10 is a flowchart illustrating a method for controlling the scene structure of the multiple channels using the stream source of FIG. 9.

FIG. 10 is a flowchart illustrating a method for controlling the scene structure of the multiple channels by using the stream source of FIG. 9.

As illustrated in FIG. 10, the demultiplexer 510 separates multiplexed logical channels on a channel-by-channel basis and allocates the separated logical channels to the decoding buffers 530 in step 1003 when the mobile terminal receives LASeR data streams of multiple channels from the service provider in step 1001. The decoder 550 decodes channel-by-channel streams output to the decoding buffers 530 and outputs decoded ESs of the logical channels to the composition memory 570. In step 1005, the image compositor 590 determines the display mode of an associated group ID when a physical channel with a new group ID has been received.

When the display mode is determined to be the channel mosaic scene structure in step 1007, the image compositor 590 divides an image using the information of the stream source node 900 received from the decoder 550 and allocates channel-by-channel regions in step 1009. In step 1011, the image compositor 590 reads and displays frames of ESs mapped to channel-by-channel regions from the composition memory 570.

When a determination is made that the display mode is the channel circulation scene structure in step 1013, the image compositor 590 initializes the timer and reads and displays an associated ES from the composition memory 570. When a designated slot time for displaying one logical channel has elapsed, the image compositor 590 displays an ES of the next logical channel after verifying and applying the designated transition effect in steps 1015 to 1023. Because steps 1015 to 1023 are the same as steps 819 to 827 of FIG. 8, a detailed description is omitted.

The conventional LASeR technology provides a multi-channel scene structure service on an additional mosaic channel. However, when multiple logical channels are multiplexed into one physical channel in this exemplary embodiment of the present invention, the terminal expresses multiple ESs from the service provider in one group without using an additional mosaic channel. Various multi-channel images can be dynamically composed using information of the stream source node 900 including image structure information.

As is apparent from the above description, a terminal of a mobile broadcast system can receive logically multiplexed channels and control an image structure using stream source information received from a service provider.

Moreover, an exemplary embodiment of the present invention may efficiently employ channel resources by composing a logically multiplexed channel scene without use of an additional mosaic channel.

An exemplary embodiment of the present invention may also prevent the degradation of image quality when channel-by-channel images are multiplexed and encoded into one mosaic channel in order to compose a multiplexed channel image in the mobile broadcast system.

Moreover, an exemplary embodiment of the present invention may control an image structure of a channel circulation or combination scene structure in the mobile broadcast system, such that a user may easily identify service content on a terminal screen with a limited size and all channels are circulated and viewed in the channel circulation scene structure without user input.

An exemplary embodiment of the present invention may be integrated with a channel mosaic service proposed in the conventional LASeR technology. Thus, an exemplary embodiment of the present invention may be compatible with the conventional LASeR technology and may exploit features of the conventional LASeR in an efficient image structure using a synchronization packet structure and scalable vector graphics (SVG).

While the present invention has been shown and described with reference to certain exemplary embodiments thereof, it will be understood by those skilled in the art that various changes in form and details may be made without departing from the spirit and scope of the invention as defined by the appended claims and their equivalents.

What is claimed is:

1. A method for controlling a scene structure to be displayed on a terminal in a broadcast system, comprising:
   receiving, from a service provider, a physical channel having multiplexed logical channels for a broadcast service and stream source node information for controlling a scene structure;
   demultiplexing the received physical channel and decoding the logical channels; and
   displaying streams of the decoded logical channels based on the stream source node information,
   wherein the stream source node information comprises a source index field for indicating an index of a source used for a current scene, and a mode field, and
   wherein the mode field comprises a playList field for sequentially displaying different streams and a replace field for immediately switching a stream when a source index is changed.

2. The method of claim 1, further comprising determining at least one display mode of a physical channel with a new group identifier (ID) after receiving the physical channel with the new group ID.

3. The method of claim 1, wherein displaying the streams comprises;
   dividing an image into multiple regions when at least one display mode determined based on the stream source node information comprises a channel mosaic scene structure; and
   allocating the multiple regions on each of the logical channels and displaying frames of the streams on the multiple regions.

4. The method of claim 1, wherein displaying the streams comprises;
   displaying the streams in sequence when at least one display mode determined based on the stream source node information comprises playlist mode.

5. The method of claim 4, further comprising
   determining whether scene transition effect is applied; and
   applying a scene transition effect when the streams are circulated if the scene transition effect is applied.

6. The method of claim 1, wherein displaying the streams comprises:
   dividing an image into a main image region and a sub-image region when the at least one display mode determined based on the stream source node information comprises a combination scene structure;
   displaying the streams of the logical channels on the main image region during a slot time in sequence; and
   displaying the streams of multiple logical channels on the sub-image region.

7. The method of claim 1, wherein the stream source node information comprises at least one of:
   a static mosaic field for indicating a static mosaic composition method for an image representation; and
   a dynamic mosaic field for indicating a dynamic mosaic composition method for an image representation.

8. The method of claim 1, wherein the stream source node information further comprises a source field for indicating a list of identifiers to be referred to by a stream source, and a field for indicating a size of a buffer.

9. The method of claim 1, wherein the mode field further comprises at least one of a useOld field for composing a stream of a previous source index on the image until a stream pointed by a new source index is ready, and a keepOld field for decoding the stream of the previous source index and composing the decoded stream on the image while receiving the stream of the previous source index until the stream pointed by the new source index is ready.

10. The method of claim 7, wherein the dynamic mosaic field comprises at least one of the playList field, a tile field for displaying all streams of the group on one image in the at least one display mode, and a combination field in which the channel circulation scene structure and the channel mosaic scene structure are combined in the at least one display mode.

11. The method of claim 1, wherein the playList field comprises a slotTime field for indicating a image display time allocated to each source.

12. The method of claim 1, wherein the playList field comprises a transitionEffect field for indicating scene transition effect when streams are switched.

13. An apparatus for controlling a sence structure to be displayed on a terminal in a broadcast system, comprising:
   a receiver for receiving, from a service provider, a physical channel having multiplexed logical channels for a broadcast service and stream source node information for controlling a scene structure; and
   a demultiplexer for demultiplexing the received physical channel;
   at least a buffer for storing the logical channels; and
   an image compositor for controlling an operation for displaying the streams of the logical channels based on the stream source node information,
   wherein the stream source node information comprises a source index field for indicating an index of a source used for a current scene, and a mode field, and
   wherein the mode field comprises a playList field for sequentially displaying different streams and a replace field for immediately switching a stream when a source index is changed.

14. The apparatus of claim 13, wherein the image compositor is further configured to determine at least one display mode of a physical channel with a group identifier (ID) after receiving the physical channel with the new group ID.

15. The apparatus of claim 13, wherein the image compositor controls an operation for dividing an image into multiple regions when at least one display mode determined based on the stream source node information comprises a channel mosaic scene structure, allocating the multiple regions on the logical channels, and displaying frames of the streams on the multiple regions.

16. The apparatus of claim 13, wherein the image compositor controls an operation for displaying the streams in sequence when at least one display mode determined based on the stream source node information comprises playlist mode.

17. The apparatus of claim 13, wherein the image compositor controls an operation for determining whether scene transition effect is applied and applying a scene transition effect when the streams are circulated if the scene transition effect is applied.

18. The apparatus of claim 13, wherein the image compositor controls an operation for dividing an image into a main image region and a sub-image region when at least one display mode determined based on the stream source node information comprises a combination scene structure displaying the streams of the logical channels on the main image region during a slot time in sequence, and displaying the streams of the logical channels on the sub-image region.

19. The apparatus of claim 13, wherein the stream source node information comprises at least one of:
   a static mosaic field for indicating a static mosaic composition method for an image representation; and
   a dynamic mosaic field for indicating a dynamic mosaic composition method for an image representation.

20. The apparatus of claim 13, wherein the stream source node information further comprises a source field for indicating a list of identifiers to be referred to by a stream source, and a field for indicating a size of a buffer.

21. The apparatus of claim 13, wherein the mode field futher comprises at least one of a useOld field for composing a stream of a previous source index on the image until a stream pointed by a new source index is ready, and a keepOld field for decoding the stream of the previous source index and composing the decoded stream on the image while receiving the stream of the previous source index until the stream pointed by the new source index is ready.

22. The apparatus of claim 19, wherein the dynamic mosaic field comprises at least one of the playList field, a tile field for displaying all streams of the group on one image in the at least one display mode, and a combination field in which the channel circulation scene structure and the channel mosaic scene structure are combined in the at least one display mode.

23. The apparatus of claim 13, wherein the playList field comprises a slotTime field for indicating an image display time allocated to each source.

24. The apparatus of claim 13, wherein the playList field comprises a transitionEffect field for indicating scene transition effect when streams are switched.

* * * * *